United States Patent
Jang et al.

(10) Patent No.: US 9,096,256 B2
(45) Date of Patent: Aug. 4, 2015

(54) ELECTRIC POWER STEERING SYSTEM AND STEERING ANGLE OUTPUTTING METHOD THEREOF

(71) Applicant: MANDO CORPORATION, Pyeongtaek-si, Gyeonggi-do (KR)

(72) Inventors: Hyun Seop Jang, Yongin-si (KR); Do Wook Kwon, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 152 days.

(21) Appl. No.: 13/968,246

(22) Filed: Aug. 15, 2013

(65) Prior Publication Data

US 2014/0052331 A1    Feb. 20, 2014

(30) Foreign Application Priority Data

Aug. 16, 2012 (KR) .................. 10-2012-0089652

(51) Int. Cl.
*B62D 5/04* (2006.01)
*B62D 6/10* (2006.01)
*B62D 15/02* (2006.01)

(52) U.S. Cl.
CPC ............... *B62D 5/0481* (2013.01); *B62D 6/10* (2013.01); *B62D 15/0215* (2013.01); *B62D 15/0245* (2013.01)

(58) Field of Classification Search
CPC .. B62D 5/0481; B62D 5/0484; B62D 5/0487; B62D 5/049; B62D 5/493; B62D 15/021; B62D 15/0215; B62D 15/0245

USPC .............. 701/41, 29.1, 29.7, 30.3, 30.5–31.2, 701/32.7, 34.4
See application file for complete search history.

(56) References Cited

U.S. PATENT DOCUMENTS

| | | | |
|---|---|---|---|
| 6,129,172 A * | 10/2000 | Yoshida et al. ............... | 180/446 |
| 6,847,876 B2 * | 1/2005 | Tokumoto ...................... | 701/41 |
| 7,444,217 B2 * | 10/2008 | Matsuoka ..................... | 701/31.1 |
| 7,543,679 B2 * | 6/2009 | Colosky ........................ | 180/444 |
| 8,209,079 B2 * | 6/2012 | Nakane ........................ | 701/29.8 |
| 8,938,334 B2 * | 1/2015 | Wei et al. ........................ | 701/41 |
| 2003/0100981 A1 * | 5/2003 | Suzuki ........................... | 701/43 |
| 2003/0218126 A1 * | 11/2003 | Shiba ....................... | 250/231.13 |
| 2004/0056748 A1 * | 3/2004 | Masaki et al. ................ | 336/119 |
| 2004/0188172 A1 * | 9/2004 | Asada ........................... | 180/446 |
| 2005/0065686 A1 * | 3/2005 | Kohno et al. ................... | 701/41 |
| 2009/0125187 A1 * | 5/2009 | Yamamoto et al. ............ | 701/42 |
| 2010/0023212 A1 * | 1/2010 | Kim .............................. | 701/37 |

FOREIGN PATENT DOCUMENTS

| | | | | |
|---|---|---|---|---|
| DE | | 100 36 281 A1 | 2/2002 | |
| DE | 10 2005 037 938 A1 | | 2/2007 | |
| DE | 10 2009 034 077 A1 | | 3/2010 | |
| DE | 10 2010 053 596 A1 | | 6/2012 | |
| JP | | 2005274484 A * | 10/2005 | ............ G01B 21/22 |

* cited by examiner

*Primary Examiner* — Thomas G Black
*Assistant Examiner* — Sara Nelson
(74) *Attorney, Agent, or Firm* — McDermott Will & Emery LLP

(57) ABSTRACT

The present invention provides a system and method of providing high reliability for an absolute angle in an electric power steering system in which the final absolute steering angle is calculated using a device configured to measure an absolute steering angle and a relative steering angle.

8 Claims, 2 Drawing Sheets

ELECTRIC POWER STEERING SYSTEM AND STEERING ANGLE OUTPUTTING METHOD THEREOF

CROSS-REFERENCE TO RELATED APPLICATION

This application claims priority from and the benefit under 35 U.S.C. §119(a) of Korean Patent Application No. 10-2012-0089652, filed on Aug. 16, 2012, which is hereby incorporated by reference for all purposes as if fully set forth herein.

BACKGROUND OF THE INVENTION

1. Field of the Invention

The present invention relates to an electric power steering system and a method of outputting a steering angle thereof.

2. Description of the Prior Art

As a means for ensuring the stability of a steering state by reducing steering force of a steering wheel, a power steering system may be applied to a vehicle. Such a power steering system may be classified into a Hydraulic Power Steering (HPS) system using hydraulic force and an Electric Power Steering (EPS) system using rotational force of a motor.

The electric power steering system includes an Electronic Control Unit (ECU) configured to control the driving of a motor according to a running state of the vehicle sensed by, for example, a torque sensor that senses the torque of a steering shaft and a vehicle speed sensor that senses the speed of the vehicle in such a manner that while moving at low speeds, light and convenient steering feeling may be provided, while moving at high speeds, a heavy and good direction stability may be provided, and in an emergency situation, rapid steering may be performed. As a result, the electric power steering system may provide optimum steering conditions to a driver.

In the electric power steering system, the torque sensor may include a device configured to measure an absolute steering angle and a device configured to measure a relative steering angle. The ECU may calculate the final desired absolute steering angle using the measured absolute steering angle and relative steering angle.

In order to ensure the reliability of the measured final absolute steering angle, verification of the absolute steering angle and the relative steering angle measured by the devices is required. In particular, according to the introduction of ISO 26262 ("Road vehicles—Functional safety") standard absolute, high reliability for the steering angle is demanded.

SUMMARY OF THE INVENTION

Accordingly, the present invention has been made to solve the above-mentioned problems occurring in the prior art, and an object of the present invention is to provide a system and method of providing highly reliable absolute angle in an electric power steering system in which the final absolute steering angle is calculated using a device configured to measure an absolute steering angle and a relative steering angle. In particular, an object of the present invention is to provide a method of verifying (fail-safety) the absolute angle from a torque sensor that uses one hall IC for calculating the absolute angle.

In accordance with an aspect of the present invention there is provided an electric power steering system including a torque sensor and an electronic control unit. The torque sensor includes a first rotor connected to an input shaft, a second rotor connected to an output shaft, a first angle device configured to measure an absolute steering angle of the first rotor, and second and third angle devices configured to measure a relative steering angle of the second rotor. The electronic control unit includes: a reference steering angle determination unit configured to determine a reference steering angle based on the absolute steering angle and the relative steering angle, a first tracing unit (a first angle follower) configured to generate a PWM signal based on the absolute steering angle and the reference steering angle, second and third tracing units (second and third angle followers) configured to trace and accumulate first and second absolute steering angles based on the relative steering angle and the reference steering angle, a verification unit configured to determine whether or not a difference between the PWM signal and the first and second absolute steering angles is smaller than a reference value, and a steering angle providing unit configured, when the difference between the PWM signal and the first and second absolute steering angles is smaller than the reference value, to calculate a final absolute steering angle by averaging the first absolute steering angle and the second absolute steering angle and provide the calculated final absolute steering angle.

The verification unit may determine whether or not the difference between the first absolute steering angle and the second absolute steering angle is smaller than the reference value. When the difference between the first absolute steering angle and the second absolute steering angle is smaller than the reference value, the verification unit may determine whether or not the difference between the PWM signal and the first and second absolute steering angles is smaller than the reference value.

When the difference between the PWM signal and the first and second absolute steering angles exceeds the reference value, the steering angle providing unit may provide the final absolute steering angle by averaging the first and second absolute steering angles accumulated before the difference between the PWM signal and the first and second absolute steering angles exceeds the reference value.

The electric power steering system may further include: a warning output unit configured to output warning information set in advance when the number of times in which the difference between the PWM signal and the first and second absolute steering angles exceeds the reference value exceeds a reference number of times.

In accordance with another aspect of the present invention, there is provided a method of outputting a steering angle of an electric power steering system which includes a first rotor connected to an input shaft, a second rotor connected to an output shaft, a first angle device configured to an absolute steering angle of the first rotor, and second and third angle devices configured to measure a relative steering angle of the second rotor. The method includes: determining a reference steering angle based on the absolute steering angle and the relative steering angle; generating a PWM signal based on the absolute steering angle and the reference steering angle; tracing and accumulating first and second absolute steering angles based on the relative steering angle and the reference steering angle; determining whether or not a difference between the PWM signal and the first and second absolute steering angles is smaller than a reference value; and when the difference between the first absolute steering angle and the second absolute steering angle is smaller than the reference value, providing a final absolute steering angle by averaging the first absolute steering angle and the second absolute steering angle.

When determining the reference steering angle, it is determined whether or not the difference between the first absolute steering angle and the second absolute steering angle is smaller than the reference value, and when the difference between the first absolute steering angle and the second absolute steering angle is smaller than the reference value, it is determined whether or not the difference between the PWM signal and the first and second absolute steering angles is smaller than the reference value.

When the difference between the PWM signal and the first and second absolute steering angles exceeds the reference value, the final absolute steering angle is provided by averaging the first and second absolute steering angles accumulated before the difference between the PWM signal and the first and second absolute steering angles exceeds the reference value.

When the number of times in which the difference between the PWM signal and the first and second absolute steering angles exceeds the reference value exceeds a reference number of times, warning information set in advance is output.

According to the present invention, it is possible to provide a system and method for providing high reliability for an absolute angle in an electric power steering system which calculates a final absolute steering angle using an absolute steering angle and a relative steering angle. In particular, the present invention may provide a method of magnifying (fail-safety) an absolute angle from a torque sensor using one hall sensor for calculating the absolute angle.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings.

Figure 1:
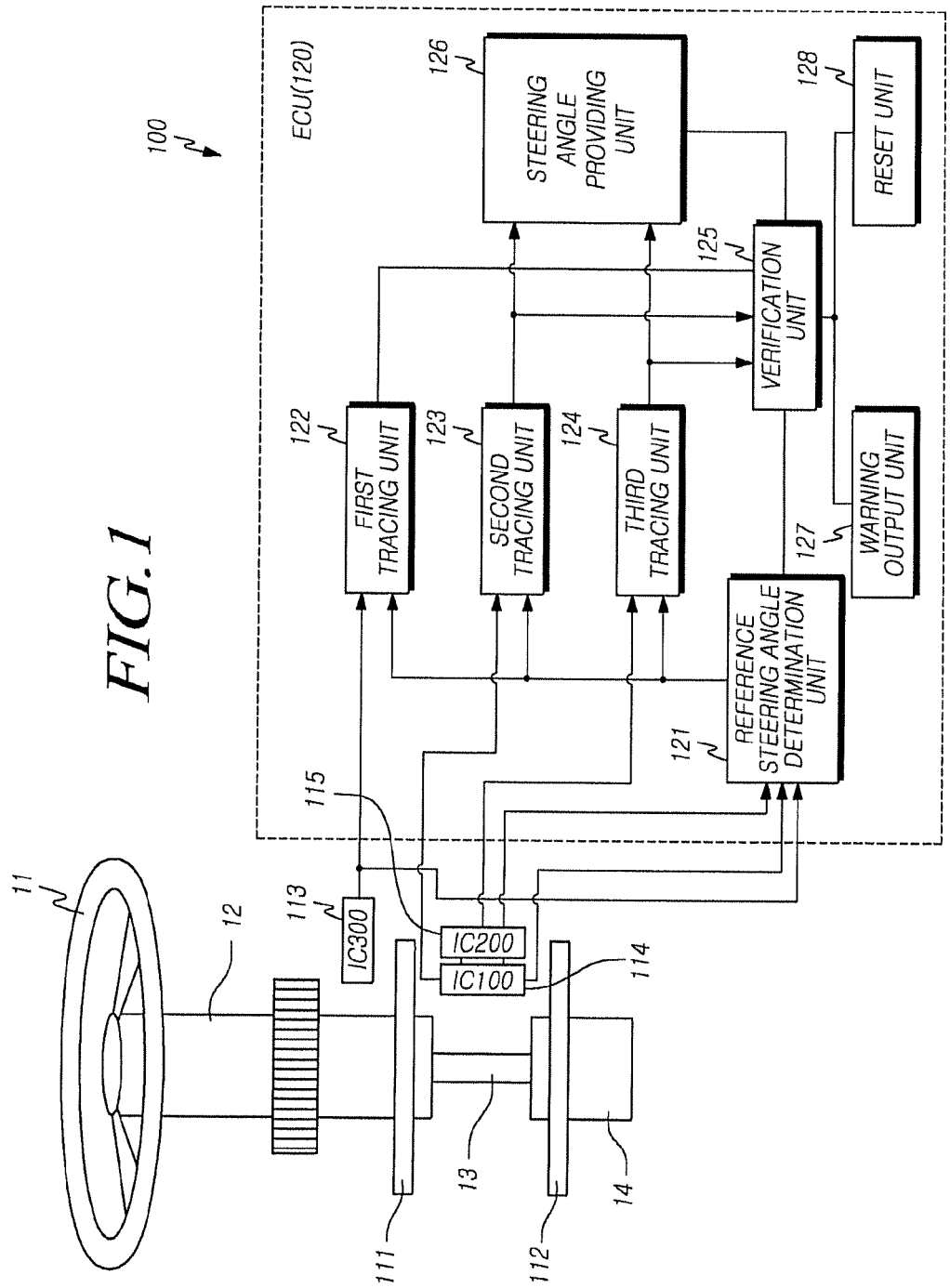
FIG. 1 is a block diagram illustrating an electric power steering system according to an exemplary embodiment of the present invention.

FIG. 1 is a block diagram illustrating a configuration of an electric power steering system according to an exemplary embodiment of the present invention.

Referring to FIG. 1, the electric power steering system 100 according to an exemplary embodiment of the present invention may be coupled to a steering shaft which includes a steering wheel 11, an input shaft 12, a torsion bar 13, and an output shaft 14. When a driver rotates the steering wheel 11, the rotating force of the steering wheel 11 is transmitted through the input shaft 12, the torsion bar 13, and the output shaft 14 to change the direction of vehicle's wheels to be steered (not illustrated). The torsion bar 13 is provided between the input shaft 12 and the output shaft 14 to be capable of measuring the level of torsion generated between the input shaft 12 and output shaft 14.

The electric power steering system 100 includes a torque sensor 110 configured to sense a torque applied to the steering shaft, and an Electronic Control Unit (ECU) 120 configured to calculate and output a steering angle based on a torque signal sensed by the torque sensor 110.

The torque sensor 110 includes a first rotor 111 connected with the input shaft 12, a second rotor 112 connected with the output shaft 14, a first angle device 113 configured to measure an absolute steering angle of the first rotor 111, and second and third angle devices 114 and 115 configured to measure the relative steering angle of the second rotor 112.

The first angle device 113 provides data obtained by measuring the absolute steering angle of the first rotor 111 to the electronic control unit 120. The first angle device 113 may be arranged in parallel to the first rotor 111. The first angle device 113 may be a hall IC.

The second and third angle devices 114 and 115 provide data obtained by measuring the relative steering angle of the second rotor 112 to the electronic control unit 120. The second and third angle devices 114 and 115 may be arranged between the first rotor 111 and the second rotor 112. Meanwhile, the second and third angle devices 114 and 115 may also measure the relative steering angle of the first rotor 111.

When the second angle device 114 and third angle device 115 measure the angle of the input shaft 12 through the first rotor 111, it may be difficult to detect the angle in certain circumstances. In an Electric Power Steering (EPS), the input shaft 12 and the output shaft 14 are mechanically configured to have the same angular displacement when the EPS motor is operated. However, in certain circumstances, for example, in the circumstance where the steering wheel 11 is instantly displaced or minutely steered, it may be difficult to ensure the angle since only the angle of the input shaft 12 may be varied. When the second angle device 114 and third angle device 115 measure the angle of the output shaft 14 through the second rotor 112, it may be possible to detect the angle even in such a circumstance.

The electronic control unit 120 includes a reference steering angle determination unit 121, a first tracing unit 122, a second tracing unit 123, a third tracing unit 124, a verification unit 125, a steering angle providing unit 126, a warning output unit 127, and a reset unit 128.

The reference steering angle determination unit 121 receives an absolute steering angle signal from the first angle device 113 configured to measure the absolute steering angle of the first rotor 111, and receives first and second relative steering angle signals from the second and third angle devices 114 and 115 configured to measure the relative steering angle of the second rotor 112. The reference steering angle determination unit 121 determines a reference steering angle based on the absolute steering angle signal, and first and second relative steering angle signals using a vernier algorithm. That is, the reference steering angle determination unit 121 is used to measure the steering angle in a method similar to a vernier calipers that measures a length using a main scale and a vernier.

The first tracing unit 122 receives a reference steering angle from a reference steering angle determination unit and an absolute steering angle from the first angle device 113, and based on these, generates a Pulse Width Modulation (PWM) signal of the absolute steering angle.

The second tracing unit 123 receives the reference steering angle from the reference steering angle determination unit and a first relative steering angle from the second angle device 114. Then, the second tracing unit 123 traces a first absolute steering angle rotated from the reference steering angle and accumulates the traced first absolute steering angle.

The third tracing unit 124 receives the reference steering angle from the reference steering angle determination unit 121 and a second relative steering angle from the third angle device 115. Then, the third tracing unit 124 traces a second absolute steering angle rotated from the reference steering angle and accumulates the traced second absolute steering angle.

The verification unit 125 verifies the reliability of the steering angle signals generated in the first to third tracing units 122 to 124.

First, the verification unit 125 determines whether or not the difference between the first absolute steering angle traced by the second tracing unit 123 and the second absolute steering angle traced by the third tracing unit 124 is smaller than a reference value set in advance. When the difference between the first absolute steering angle and the second absolute steering angle is smaller than the reference value, the verification unit 125 also determines whether or not the difference between the first and second absolute steering angles and the PWM signal traced by the first tracing unit 122 smaller than a reference value set in advance. The reference value used when comparing the first absolute steering angle and the second absolute steering angle and the reference value used when comparing the first and second absolute steering angles and the PWM signal may be equal to or different from each other.

The comparison of the first absolute steering angle and the second absolute steering angle enables the redundant check between the second angle device 114 and the third angle device 115 which measure the relative steering angles. The comparison of the first and second absolute steering angles and the PWM signal enables the redundant check of the first angle device 113 which measures the absolute steering angle.

When the difference between the first and second absolute steering angles and the PWM signal is smaller than the reference value, it is determined to be in a normal state. However, when the difference between the first and second absolute steering angles and the PWM signal exceeds the reference value, it is determined to be in an abnormal state in which the torque sensor is abnormal or the rotor is abnormal.

When it is determined to be in the normal state by the verification unit 125, the steering angle providing unit 126 calculates the final absolute steering angle by averaging the first absolute steering angle and the second absolute steering angle and outputs the absolute steering angle.

Meanwhile, when it is determined to be in the abnormal state by the verification unit 125, the steering angle providing unit 126 calculates the final absolute steering angle by averaging the first absolute steering angle and the second absolute steering angle prior to the abnormal state and outputs the final absolute steering angle. The final absolute steering angle steering provided from the angle providing unit 126 may be used for power steering.

Meanwhile, the verification unit 125 may also determine whether the number of continuous detection times of the abnormal state (the state where the difference between the first absolute steering angle and the second absolute steering angle or the difference between the first and second absolute steering angles and the PWM signal exceed the reference value) exceeds the reference number of times.

When the abnormal state is detected in excess of the reference number of times by the verification unit 125, the warning output unit 126 may provide pre-set warning information to the driver.

Meanwhile, when the verification unit 125 detects the normal state after the abnormal state has been continuously detected over the reference number of times, the reset unit 127 may reset the accumulated number of times of abnormal state to "0".

Figure 2:
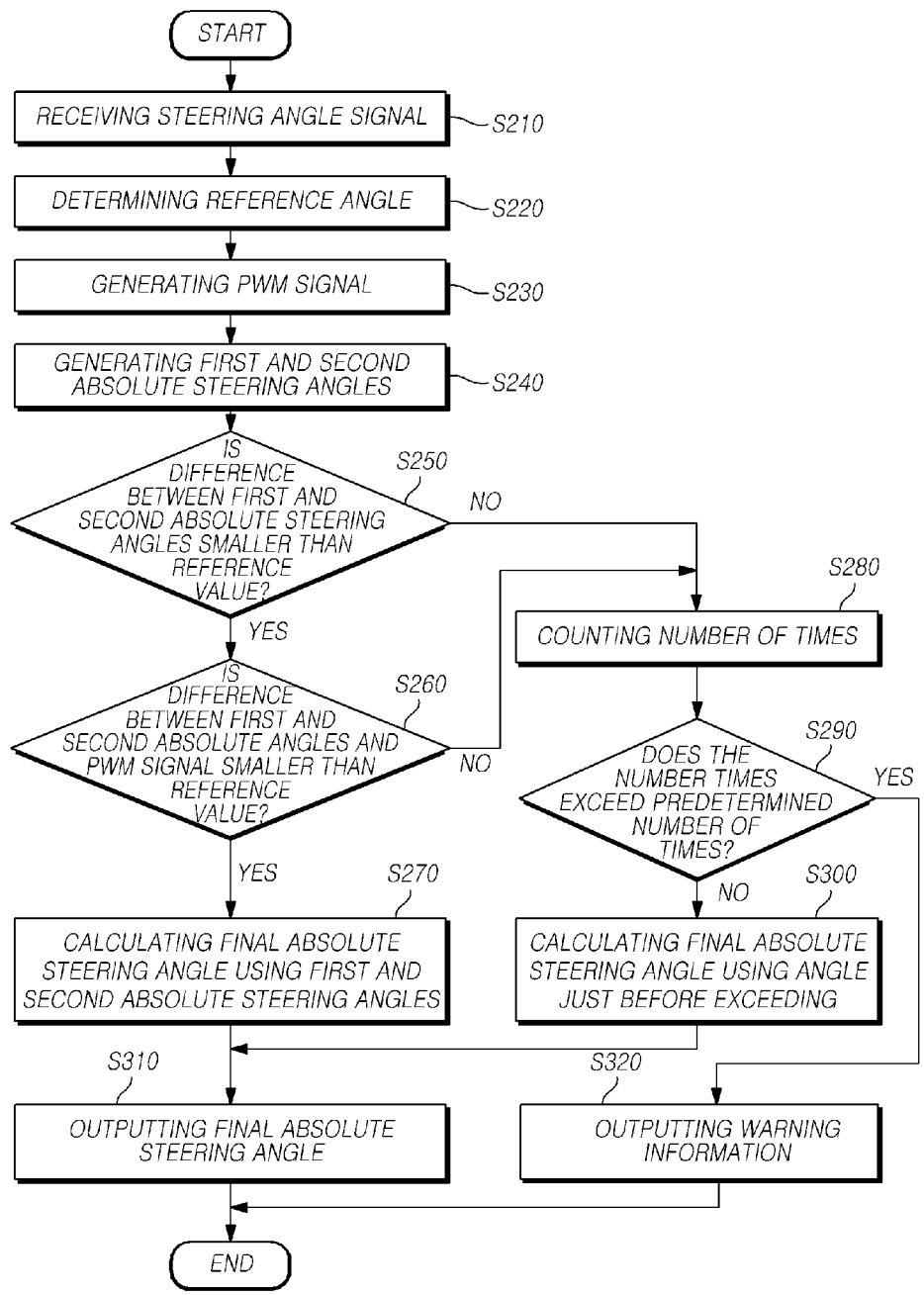
FIG. 2 is a flowchart illustrating a method of outputting a steering angle of an electric power steering system steering angle according to an exemplary embodiment of the present invention.

FIG. 2 is a flowchart illustrating a method of outputting a steering angle of an electric power steering system according to an exemplary embodiment of the present invention.

Referring to FIG. 2, the electronic control unit 120 receives an absolute angle from the first angle device 113 which measures the absolute steering angle of the first rotor 111, and receives first and second relative steering angle signals from the second and third angle devices 114 and 115 which measure the relative steering angle of the second rotor 112 (S210).

The electronic control unit 120 determines a reference steering angle based on the absolute steering angle signal and the first and second relative steering angles using a vernier algorithm (S220).

The electronic control unit 120 generates a PWM signal based on the absolute steering angle signal and the reference steering angle (S230), and generates a first absolute steering angle and a second absolute steering angle based on the first and second relative steering angle signals and the reference steering angle (S240).

The electronic control unit 120 determines whether or not the difference between the first absolute steering angle and the second absolute steering angle is smaller than a reference value set in advance (S250). When the difference between the first absolute steering angle and the second absolute steering angle is smaller than the reference value (YES in S250), the electronic control unit 120 determines whether the difference between the first and second absolute steering angles and the PWM signal is smaller than a reference value set in advance (S260). When the difference between the first absolute steering angle and the second absolute steering angle is smaller than the reference value and the difference between the first and second absolute steering angles and the PWM signal is also smaller than the reference value (YES in S250 and YES in S260), the electronic control unit 120 calculates the final absolute steering angle as the average of the first absolute steering angle and the second absolute steering angle (S270).

Meanwhile, when the difference between the first absolute steering angle and the second absolute steering angle exceeds the reference value (NO in S250), or the difference between the first and second absolute steering angles and the PWM signal exceeds the reference value (NO in S260), the electronic control unit 120 counts the number of times exceeding the reference value (S280) and determines whether the counted number of times is smaller than a predetermined number of times (S290). When the counted number of times is smaller than the predetermined number of times (YES in S290), the electronic control unit 120 calculates the final absolute steering angle by averaging the first absolute steering angles and the second absolute steering angles accumulated before the difference between the first absolute steering angle and the second absolute steering angle exceeds the reference value or before the difference between the first and second absolute steering angles and the PWM signal exceeds the reference value (S300).

In step S310, the electronic control unit 120 outputs the final absolute steering angle calculated in step S270 or the final absolute steering angle calculated in step S300 for power steering.

Meanwhile, when the counted number of times exceeds a predetermined number of times (NO in S290), the electronic control unit 120 outputs warning information (S310).

The present invention is not limited to the above-described exemplary embodiments and may include various modifications and changes without departing from the spirit and scope of the present invention defined by the accompanying claims.

What is claimed is:

1. An electric power steering system comprising:
a torque sensor including: a first rotor connected to an input shaft, a second rotor connected to an output shaft, a first angle device configured to measure an absolute steering angle of the first rotor, and second and third angle devices configured to measure a relative steering angle of the second rotor; and an electronic control unit including: a reference steering angle determination unit configured to determine a reference steering angle based on the absolute steering angle and the relative steering angle, a first tracing unit configured to generate a PWM signal based on the absolute steering angle and the reference steering angle, second and third tracing units configured to trace and accumulate first and second absolute steering angles based on the relative steering angle and the reference steering angle, a verification unit configured to determine whether or not a difference between the PWM signal and the first and second absolute steering angles is smaller than a reference value, and a steering angle providing unit configured, when the difference between the PWM signal and the first and second absolute steering angles is smaller than the reference value, to calculate a final absolute steering angle by averaging the first absolute steering angle and the second absolute steering angle and provide the calculated final absolute steering angle.

2. The electric power steering system of claim 1, wherein the verification unit determines whether or not the difference between the first absolute steering angle and the second absolute steering angle is smaller than the reference value, and when the difference between the first absolute steering angle and the second absolute steering angle is smaller than the reference value, the verification unit determines whether or not the difference between the PWM signal and the first and second absolute steering angles is smaller than the reference value.

3. The electric power steering system of claim 1, wherein, when the difference between the PWM signal and the first and second absolute steering angles exceeds the reference value, the steering angle providing unit provides the final absolute steering angle by averaging the first and second absolute steering angles accumulated before the difference between the PWM signal and the first and second absolute steering angles exceeds the reference value.

4. The electric power steering system of claim 1, further comprising:

a warning output unit configured to output warning information set in advance when the number of times in which the difference between the PWM signal and the first and second absolute steering angles exceeds the reference value exceeds a reference number of times.

5. A method of outputting a steering angle of an electric power steering system which includes a first rotor connected to an input shaft, a second rotor connected to an output shaft, a first angle device configured to an absolute steering angle of the first rotor, and second and third angle devices configured to measure a relative steering angle of the second rotor, the method comprising:

determining a reference steering angle based on the absolute steering angle and the relative steering angle;

generating a PWM signal based on the absolute steering angle and the reference steering angle;

tracing and accumulating first and second absolute steering angles based on the relative steering angle and the reference steering angle;

determining whether or not a difference between the PWM signal and the first and second absolute steering angles is smaller than a reference value; and when the difference the difference between the first absolute steering angle and the second absolute steering angle is smaller than the reference value, providing a final absolute steering angle by averaging the first absolute steering angle and the second absolute steering angle.

6. The method of claim 5, wherein determining the reference steering angle comprises:

determining whether or not the difference between the first absolute steering angle and the second absolute steering angle is smaller than the reference value, and when the difference between the first absolute steering angle and the second absolute steering angle is smaller than the reference value, determining whether or not the difference between the PWM signal and the first and second absolute steering angles is smaller than the reference value.

7. The method of claim 5, wherein, when the difference between the PWM signal and the first and second absolute steering angles exceeds the reference value, the steering angle providing unit provides the final absolute steering angle by averaging the first and second absolute steering angles accumulated before the difference between the PWM signal and the first and second absolute steering angles exceeds the reference value.

8. The method of claim 5, further comprising:

outputting warning information set in advance when the number of times in which the difference between the PWM signal and the first and second absolute steering angles exceeds the reference value exceeds a reference number of times.

* * * * *